US012577856B2

(12) United States Patent
Gao et al.

(10) Patent No.: US 12,577,856 B2
(45) Date of Patent: Mar. 17, 2026

(54) SYSTEM AND METHOD FOR METHANE HYDRATE BASED PRODUCTION PREDICTION

(71) Applicant: Schlumberger Technology Corporation, Sugar Land, TX (US)

(72) Inventors: Bei Gao, Shanghai (CN); Yen Han Shim, Selangor (MY); Li Chen, Beijing (CN); Jichao Chen, Beijing (CN); Wei Zhang, Shenzhen (CN); Huimin Cai, Beijing (CN); Chang Wei Qu, Shenzhen (CN)

(73) Assignee: Schlumberger Technology Corporation, Sugar Land, TX (US)

( * ) Notice: Subject to any disclaimer, the term of this patent is extended or adjusted under 35 U.S.C. 154(b) by 374 days.

(21) Appl. No.: 18/260,053

(22) PCT Filed: Dec. 20, 2021

(86) PCT No.: PCT/US2021/064274
§ 371 (c)(1),
(2) Date: Jun. 30, 2023

(87) PCT Pub. No.: WO2022/146736
PCT Pub. Date: Jul. 7, 2022

(65) Prior Publication Data
US 2024/0060398 A1 Feb. 22, 2024

(30) Foreign Application Priority Data
Dec. 31, 2020 (CN) .......................... 202011616057.6

(51) Int. Cl.
*E21B 41/00* (2006.01)
*C09K 8/035* (2006.01)
(Continued)

(52) U.S. Cl.
CPC .......... *E21B 41/0099* (2020.05); *C09K 8/035* (2013.01); *E21B 49/0875* (2020.05); *E21B 49/088* (2013.01); *E21B 49/10* (2013.01)

(58) Field of Classification Search
CPC ............. E21B 41/0099; E21B 49/0875; E21B 49/088; E21B 49/10; C09K 8/035
See application file for complete search history.

(56) References Cited

U.S. PATENT DOCUMENTS

2009/0192768 A1 7/2009 Zuo et al.
2011/0029273 A1 2/2011 Lovell
(Continued)

OTHER PUBLICATIONS

Lu Yu "Experimental study and numerical modeling of methane hydrate dissociation and gas invasion during drilling through hydrate bearing formations", Journal of Petroleum Science and Engineering , pp. 505-520, May 17, 2018 (Year: 2018).*
(Continued)

*Primary Examiner* — Michael J Dalbo
*Assistant Examiner* — Kaleria Knox
(74) *Attorney, Agent, or Firm* — Jeffrey D. Frantz

(57) ABSTRACT

This disclosure relates to techniques for determining a dissociation constant of a reservoir that includes methane hydrate and generating a methane hydrate production output that may be used to inform certain decisions related to processing a reservoir that includes the methane hydrate. In some embodiments, the techniques may include determining the dissociation constant using multiple pressures measured at different flowrates at time points from within a wellbore.

20 Claims, 6 Drawing Sheets

(51) Int. Cl.
      *E21B 49/08*       (2006.01)
      *E21B 49/10*       (2006.01)

(56)             References Cited

U.S. PATENT DOCUMENTS

| | | | |
|---|---|---|---|
| 2012/0103599 A1 | 5/2012 | Hester | |
| 2018/0128938 A1* | 5/2018 | Wang | E21B 47/06 |

OTHER PUBLICATIONS

International Preliminary Report on Patentability issued in the PCT Application No. PCT/US2021/064274 dated Jul. 13, 2023, 7 pages.
International Search Report and Written Opinion issued in the PCT Application PCT/US2021/064274, dated Apr. 12, 2022 (11 pages).
Yu et al., (2018) Experimental study and numerical modeling of methane hydrate dissociation and gas invasion during drilling through hydrate bearing formations, Journal of Petroleum Science and Engineering, May 17, 2018, vol. 168, pp. 507-520.

* cited by examiner

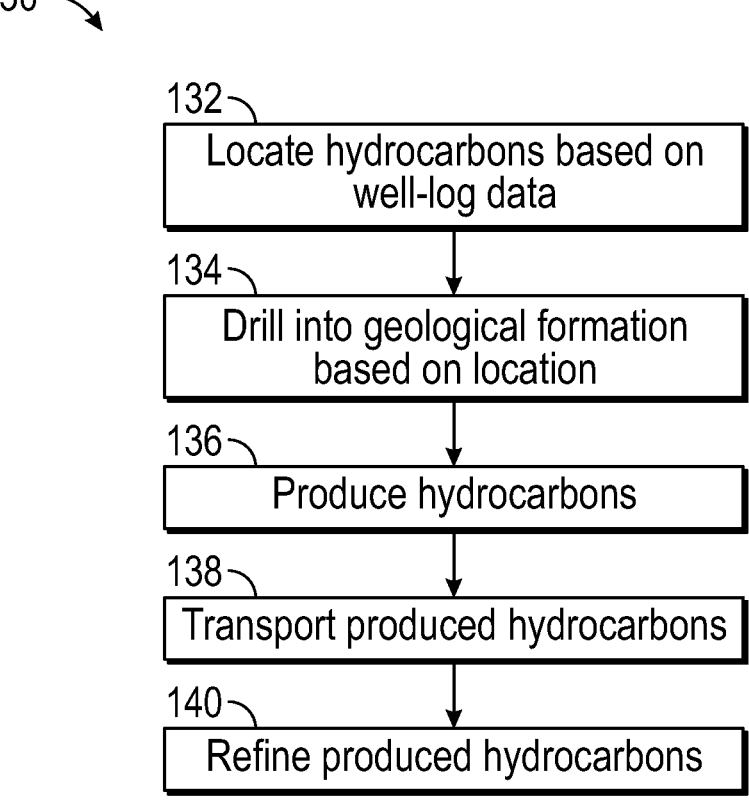

130

132 Locate hydrocarbons based on well-log data

134 Drill into geological formation based on location

136 Produce hydrocarbons

138 Transport produced hydrocarbons

140 Refine produced hydrocarbons

152 Measure one or more properties of a fluid using a downhole tool

154 Determine a dissociation constant based on the one or more properties

156 Generate a methane hydrate production output

FIG. 4

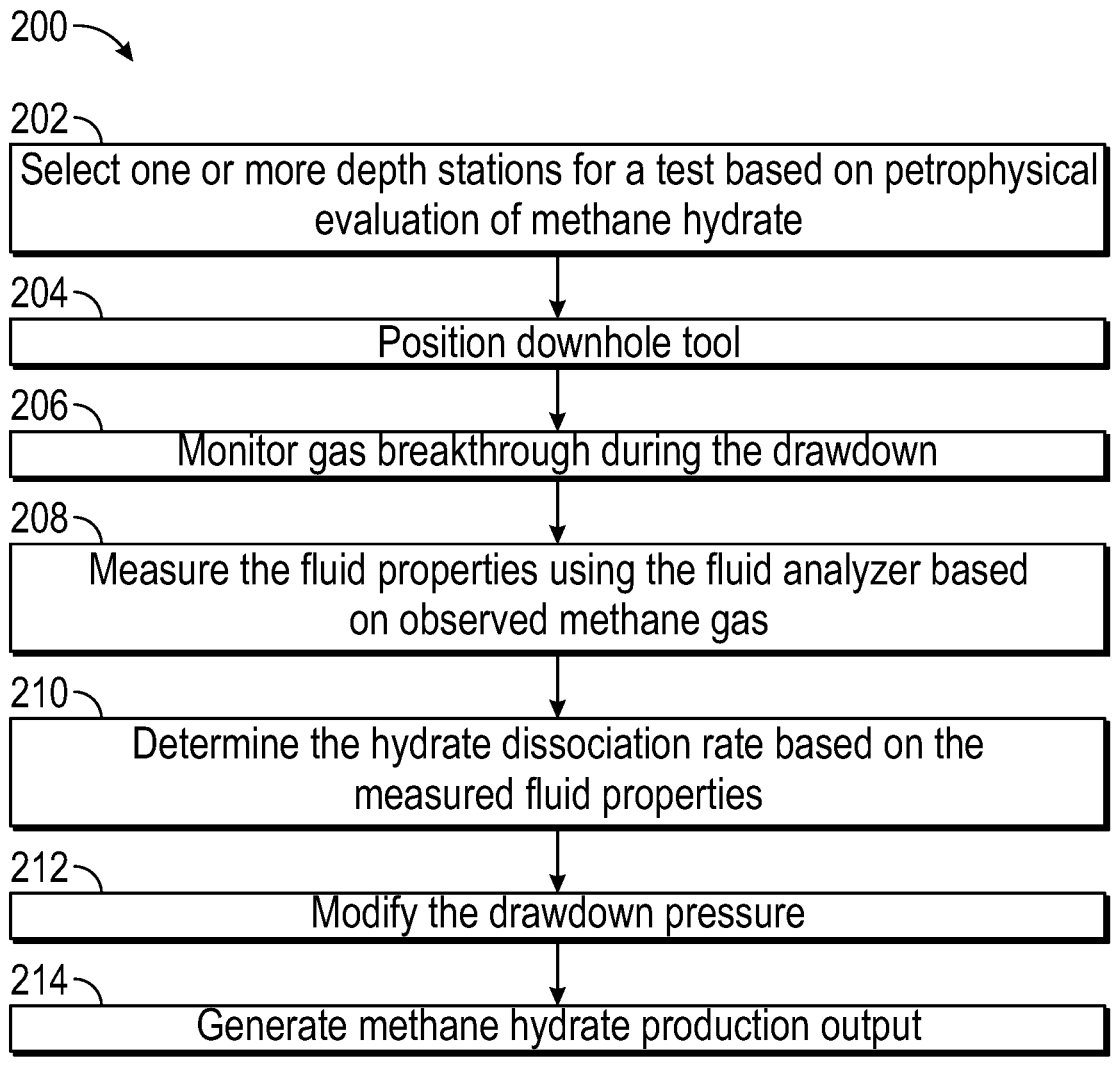

200

202
Select one or more depth stations for a test based on petrophysical evaluation of methane hydrate 204
Position downhole tool 206
Monitor gas breakthrough during the drawdown 208
Measure the fluid properties using the fluid analyzer based on observed methane gas 210
Determine the hydrate dissociation rate based on the measured fluid properties 212
Modify the drawdown pressure 214
Generate methane hydrate production output

FIG. 7

SYSTEM AND METHOD FOR METHANE HYDRATE BASED PRODUCTION PREDICTION

CROSS-REFERENCE TO RELATED APPLICATIONS

The present application is a National Stage Entry of International Application No. PCT/US2021/064274, filed Dec. 20, 2021, which claims priority benefit of Chinese Patent Application No. 202011616057.6, filed Dec. 31, 2020, the entirety of which is incorporated by reference herein and should be considered part of this specification.

BACKGROUND

This disclosure relates generally to downhole tools and more specifically to tools for determining properties associated with methane hydrate reservoirs.

A summary of certain embodiments disclosed herein is set forth below. It should be understood that these aspects are presented merely to provide the reader with a brief summary of these certain embodiments and that these aspects are not intended to limit the scope of this disclosure. Indeed, this disclosure may encompass a variety of aspects that may not be set forth below.

Reservoir fluid analysis may be used to better understand a hydrocarbon reservoir in a geological formation. Indeed, reservoir fluid analysis may be used to measure and model fluid properties within the reservoir to determine a quantity and/or quality of formation fluids—such as liquid and/or gas hydrocarbons, condensates, drilling muds, and so forth—that may provide much useful information about the reservoir. This may allow operators to better assess the economic value of the reservoir, obtain reservoir development plans, and identify hydrocarbon production concerns for the reservoir. Certain hydrocarbon reservoirs, such as gas hydrate (e.g., methane hydrate) reservoirs may change chemically over time, from solid to gas phase and liquid phase, and thus determining an amount and a volume of the gas hydrate reservoirs may be difficult.

Certain existing techniques for determining (e.g., evaluating) properties of a fluid reservoir including certain fluids (e.g., hydrocarbons that are not complexed with hydrates with regard to the phase change) may involve retrieving a core sample that includes the fluid from below a surface of a geological formation, and subsequently characterizing the core sample above the surface. However, the chemical phase of the hydrate and the formation sand may change due to the difference in temperature and/or pressure above the surface because the physics of dynamic flow for certain fluids differs from the physics of dynamic flow for methane hydrate. Additional existing techniques may determine properties of methane hydrates based on a static petrophysical evaluation within the reservoir. However, and as discussed in more detail below, the methane hydrate will experience a phase change from solid to gas and liquid (e.g., water) when a pressure of the fluid flowing from the geological formation is below a hydrate equilibrium pressure (e.g., within a reservoir of the geological formation that is being sampled and an interior of the downhole tool that is receiving the fluid flowing from the geological formation). As such, a measurement based on a static property may not indicate the phase change. Therefore, it may be difficult to accurately determine methane hydrate properties, and thus it may be difficult to use information associated with methane hydrates to inform certain oil and gas decisions, such as determining what does it meet economic value.

SUMMARY

A summary of certain embodiments disclosed herein is set forth below. It should be understood that these aspects are presented merely to provide the reader with a brief summary of these certain embodiments and that these aspects are not intended to limit the scope of this disclosure. Indeed, this disclosure may encompass a variety of aspects that may not be set forth below.

One embodiment of the present disclosure relates to a method. The method includes receiving a flow of a formation fluid into a downhole tool, wherein the formation fluid comprises methane hydrate from a geological formation. The method also includes measuring one or more flow properties of the formation fluid using the received flow of the formation fluid. Further, the method includes determining a dissociation constant of the methane hydrate based at least in part on the measured one or more flow properties of the formation fluid. Further still, the method includes generating a methane hydrate production output based on the dissociation constant of the methane hydrate.

Another embodiment of the present disclosure relates to a tangible, non-transitory, computer-readable medium, comprising computer-readable instructions that, when executed by one or more processors, cause the one or more processors to receive one or more measured flow properties of a formation fluid associated with a reservoir within a geological formation, wherein the formation fluid comprises methane hydrate. The instructions also cause the one or more processors to determine a dissociation constant of the methane hydrate based at least in part on the one or more measured flow properties of the formation fluid. The instructions also cause the one or more processors to determine a methane hydrate production output based at least in part on the dissociation constant.

Another embodiment of the present disclosure relates to a system. The system includes a downhole tool configured to receive a flow of a formation fluid from a reservoir within a geological formation. The system also includes a data processing system communicatively coupled to the downhole tool. The data processing system is configured to receive a first measurement indicative of a flowing pressure of the formation fluid into the downhole tool, wherein the formation fluid comprises methane hydrate. The data processing system is also configured to receive a second measurement indicative of an equilibrium pressure of the formation fluid. Further, the data processing system is configured to determine a dissociation constant associated with the methane hydrate based at least in part on the flowing pressure and the equilibrium pressure. Further still, the data processing system is configured to generate a methane hydrate production output based at least in part on the dissociation constant.

Various refinements of the features noted above may be undertaken in relation to various aspects of the present disclosure. Further features may also be incorporated in these various aspects as well. These refinements and additional features may exist individually or in any combination. For instance, various features discussed below in relation to one or more of the illustrated embodiments may be incorporated into any of the above-described aspects of the present disclosure alone or in any combination. The brief summary presented above is intended only to familiarize the reader with certain aspects and contexts of embodiments of the present disclosure without limitation to the claimed subject matter.

BRIEF DESCRIPTION OF THE DRAWINGS

Various aspects of this disclosure may be better understood upon reading the following detailed description and upon reference to the drawings in which:

FIG. 3 illustrates a flow chart of various processes that may be performed based on analysis of well logs, in accordance with an embodiment of the present disclosure; question on chart FIG. 4 illustrates a flow chart for determining a dissociation constant of a methane hydrate, in accordance with an embodiment of the present disclosure;

FIG. 7 illustrate a flow chart of an example method for generating a methane hydrate production output, in accordance with an embodiment of the present disclosure.

DETAILED DESCRIPTION

Figure 1:
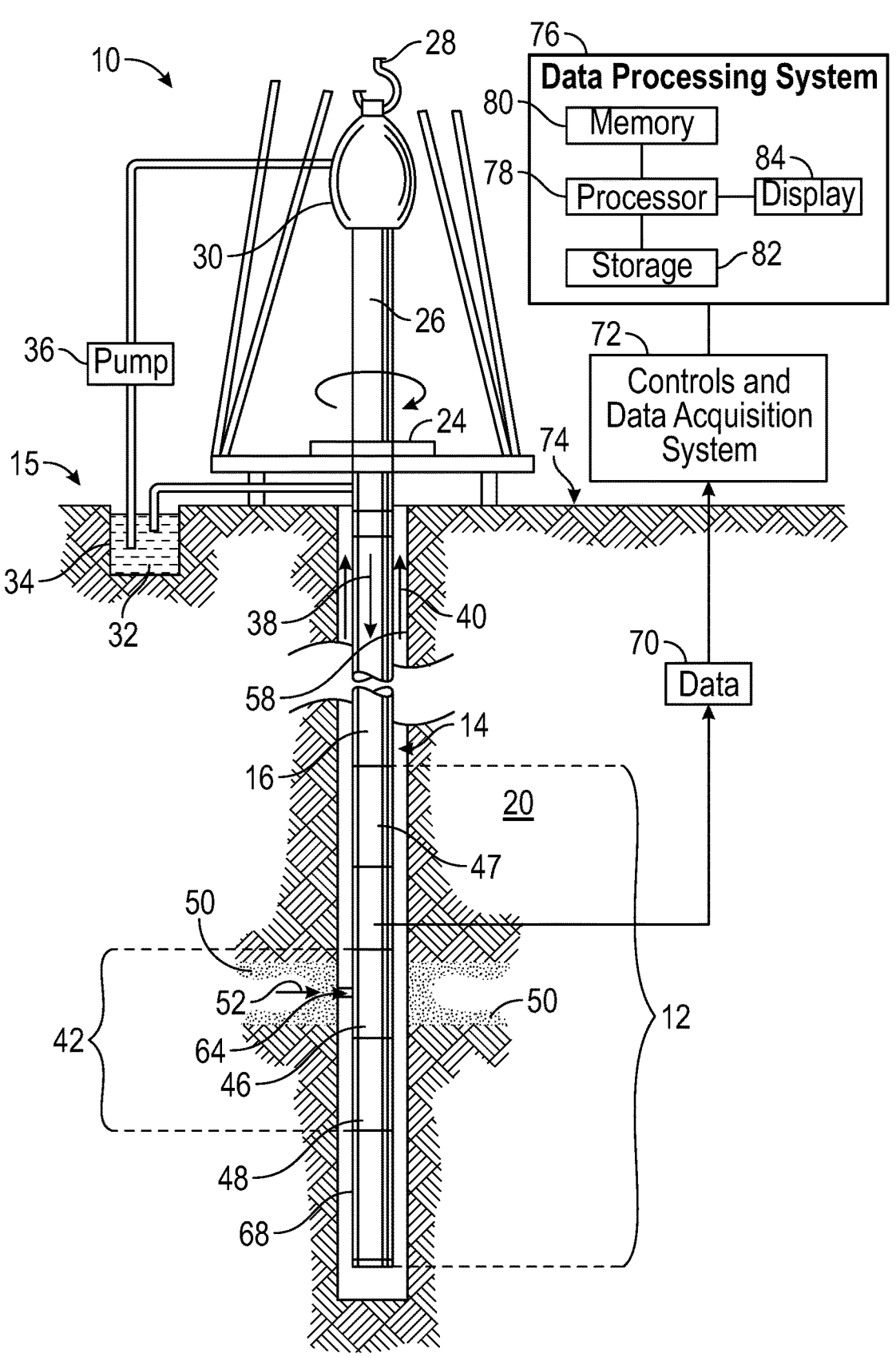
FIG. 1 is a partial cross sectional view of a drilling drilled (the test is performed in open-hole that was drilled from drilling bit) system used to measure a well through subsurface formations, in accordance with an embodiment of the present techniques.

One or more specific embodiments of the present disclosure will be described below. These described embodiments are only examples of the presently disclosed techniques. Additionally, in an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present disclosure, the articles "a," "an," and "the" are intended to mean that there are one or more of the elements. The terms "comprising," "including," and "having" are intended to be inclusive and mean that there may be additional elements other than the listed elements. Additionally, it should be understood that references to "one embodiment" or "an embodiment" of the present disclosure are not intended to be interpreted as excluding the existence of additional embodiments that also incorporate the recited features.

Formation testing provides information about the properties of a subsurface formation within geological formation such as the chemical composition and/or the amount of a component (e.g., oil, gas, water, methane hydrate, and the like) within a reservoir, which may be useful for optimizing the extraction of oil and gas from a subsurface formation. Certain reservoirs, such as gas hydrate reservoirs (e.g., methane hydrate reservoirs) may have chemical phase that are time varying. For example, the relative ratio of hydrate to methane and water may vary and the fluid (e.g., including the gas hydrate) may undergo phase changes during the fluid flow.

Accordingly, the present disclosure is directed to techniques for accurately determining properties of a hydrate (e.g., methane hydrate) reservoir. The disclosed techniques generally include measuring certain flow properties of a formation fluid and using the measured flow properties to determine physical properties of the methane hydrate reservoir such as an amount of methane hydrate a mass fraction, and the like. In one embodiment, one of the measured properties may include a flow pressure $(p_f)$ measured by a downhole tool, a flow rate $(Q_t)$, and or a gas fraction $(F_g)$ that may be determined by a down hole fluid analysis module of a downhole tool as discussed in further detail below. In another embodiment, the measured properties may include a flowing pressure $(p_f)$ measured at a first time point and an equilibrium pressure $(p_e)$ measured at a second time point corresponding to when the pressure of a fluid flowing from the geological formation is substantially at equilibrium (e.g., not changing above a threshold). In this way, properties of a methane hydrate reservoir may be determined downhole rather than in a lab or in an external environment, thereby providing more accurate properties of the methane hydrate reservoir to better inform certain oil and gas related decisions such as and whether or not, as discussed in more detail herein.

Figure 2:
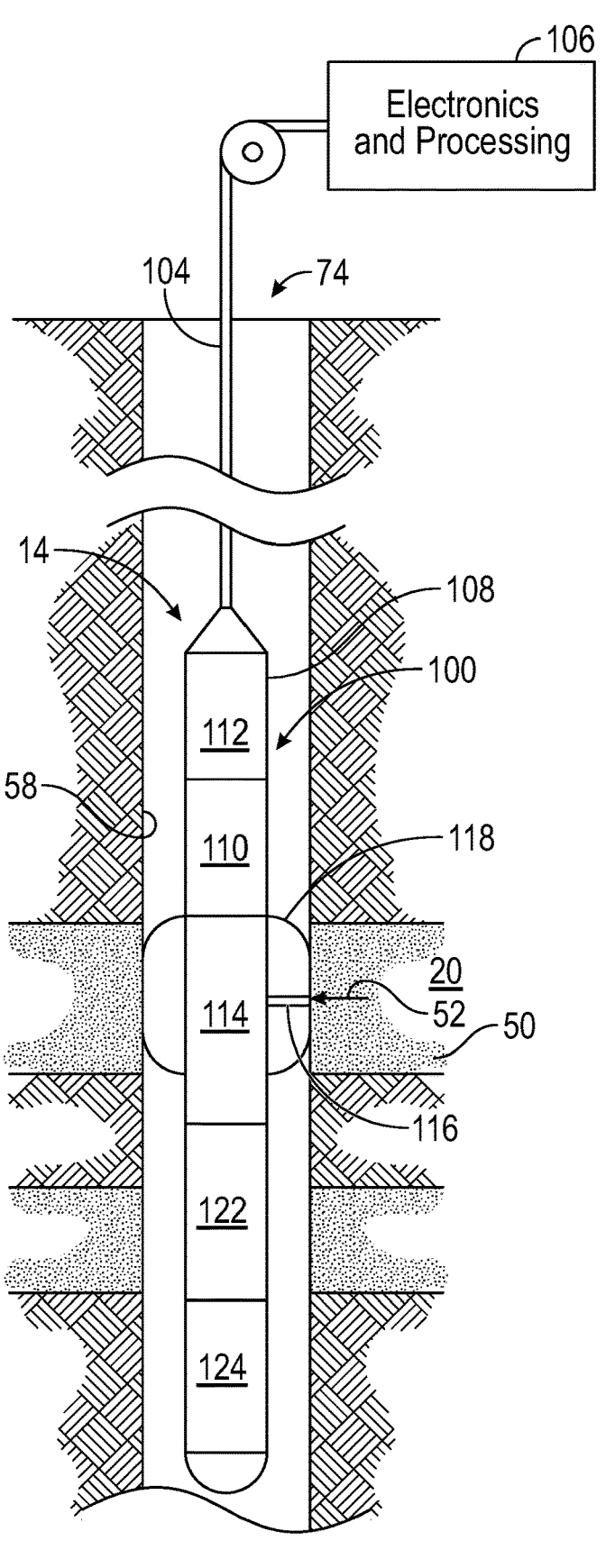
FIG. 2 is a schematic diagram of downhole equipment having various testing modules used to determine one or more characteristics of the subsurface formation, in accordance with an embodiment of the present techniques.

With the foregoing in mind, FIGS. 1 and 2 depict examples of wellsite systems that may employ the techniques described herein. FIG. 1 depicts a rig 10 with a downhole tool 12 suspended therefrom and into a wellbore 14 of a reservoir via a drill string 16. The drill string 16 is rotated by a rotary table 24, energized by means not shown, which engages a kelly 26 at the upper end of the drill string 16. The drill string 16 is suspended from a hook 28, attached to a traveling block (also not shown), through the kelly 26 and a swivel 30 (e.g., rotary swivel) that permits rotation of the drill string 16 relative to the hook 28. The rig 10 is depicted as a land-based platform and derrick assembly used to form the wellbore 14 by rotary drilling.

While the depicted embodiment relates to a downhole tool 12 disposed in a wellbore 14, it should be understood that, at least in some instances, the disclosure techniques may be used in a logging-while drilling (LWD) tool. In such an embodiment, the formation fluid or drilling mud 32 (e.g., oil base mud (OBM) or water-based mud (WBM)) may be stored in a pit 34 formed at the well site. A pump 36 delivers the reservoir fluid 52 to the interior of the drill string 16 via a port in the swivel 30, inducing the drilling mud 32 to flow downwardly through the drill string 16 as indicated by a directional arrow 38. The formation fluid exits the drill string 16 via ports of the downhole tool 12, and then circulates upwardly through the region between the outside of the drill string 16 and the wall of the wellbore 14, called the annulus, as indicated by directional arrows 40. The drilling mud 32 lubricates a drill bit and carries formation cuttings up to the surface as it is returned to the pit 34 for recirculation.

In certain embodiments, the downhole tool 12 includes a downhole analysis system. For example, the downhole tool 12 may include a sampling system 42 including a fluid communication module 46 and a sampling module 48. The modules may be housed in a drill collar for performing various formation evaluation functions, such as pressure testing and fluid sampling, among others. As shown in FIG. 1, the fluid communication module 46 is positioned adjacent the sampling module 48 and a fluid analyzer module 47 (i.e., which is discussed in more detail with regard to element 174 of FIG. 5); however, the position of the fluid communication module 46, as well as other modules, may vary in other embodiments. Additional devices, such as pumps, gauges, sensor, monitors or other devices usable in downhole sampling and/or testing also may be provided. The additional devices may be incorporated into the fluid communication module 46, the sample module 48, or disposed within separate modules included within the sampling system 42.

In some embodiments, the downhole tool 12 may be a formation testing downhole tool. For example, the downhole tool 12 may evaluate fluid properties of reservoir fluid 50. Accordingly, the sampling system 42 may include sensors that may measure fluid properties such as gas-to-oil ratio (GOR), mass density, optical density (OD), composition of $C_1$, $C_2$, $C_3$, $C_4$, $C_5$, and $C_{6+}$, formation volume factor, viscosity, resistivity, fluorescence, American Petroleum Institute (API) gravity, and combinations thereof of the reservoir fluid 50. The fluid communication module 46 includes a probe (e.g., discussed in more detail with respect to element 118 of FIG. 2), which may be positioned inside borehole. The probe includes one or more inlets for receiving the reservoir fluid 52 and one or more flowlines (not shown) extending into the downhole tool 12 for passing fluids (e.g., the reservoir fluid 50) through the tool. In certain embodiments, the probe may include a single inlet designed to direct the reservoir fluid 50 into a flowline within the downhole tool 12. Further, in other embodiments, the probe may include multiple inlets that may, for example, be used for focused sampling. In these embodiments, the probe may be connected to a sampling flowline, as well as to guard flowlines. The probe may be movable between extended and retracted positions for selectively engaging the wellbore wall 58 of the wellbore 14 and acquiring fluid samples from the geological formation 20. One or more setting accessories, standoff, or roller 64 may be provided to assist in positioning the fluid communication device against the wellbore wall 58.

In certain embodiments, the downhole tool 12 includes a spectral analysis module 68. The spectral analysis module 68 includes a radiation source that emits radiation (e.g., gamma rays) into the geological formation 20 to determine formation properties such as, e.g., lithology, density, formation geometry, reservoir boundaries, among others. The gamma rays interact with the formation through Compton scattering, which may attenuate the gamma rays. Sensors within the spectral analysis module 68 may detect the scattered gamma rays and determine the geological characteristics of the geological formation 20 based at least in part on the attenuated gamma rays. In some embodiments, the downhole tool 12 may include one or both of the spectral analysis module 68 and the fluid analyzer module 47.

The sensors within the downhole tool 12 may collect and transmit data 70 (e.g., log and/or DFA data) associated with the characteristics of the geological formation 20 and/or the fluid properties and the composition of the reservoir fluid 50 to a control and data acquisition system 72 at surface 74, where the data 70 may be stored and processed in a data processing system 76 of the control and data acquisition system 72.

The data processing system 76 may include a processor 78, memory 80, storage 82, and/or display 84. The memory 80 may include one or more tangible, non-transitory, machine readable media collectively storing one or more sets of instructions for operating the downhole tool 12, determining formation characteristics (e.g., geometry, connectivity, minimum horizontal stress, etc.) calculating and estimating fluid properties of the reservoir fluid 50, modeling the fluid behaviors using, e.g., equation of state models (EOS). The memory 80 may store reservoir modeling systems (e.g., geological process models, petroleum systems models, reservoir dynamics models, etc.), mixing rules and models associated with compositional characteristics of the reservoir fluid 50, equation of state (EOS) models for equilibrium and dynamic fluid behaviors (e.g., biodegradation, gas/condensate charge into oil, $CO_2$ charge into oil, fault block migration/subsidence, convective currents, among others not related to methane hydrate), and any other information that may be used to determine geological and fluid characteristics of the geological formation 20 and reservoir fluid 52, respectively. In certain embodiments, the data processing system 76 may apply filters to remove noise from the data 70.

To process the data 70, the processor 78 may execute instructions stored in the memory 80 and/or storage 82. For example, the instructions may cause the processor to compare the data 70 (e.g., from the logging while drilling and/or downhole analysis) with known reservoir properties estimated using the reservoir modeling systems, use the data 70 as inputs for the reservoir modeling systems, and identify geological and reservoir fluid parameters that may be used for exploration and production of the reservoir. As such, the memory 80 and/or storage 82 of the data processing system 76 may be any suitable article of manufacture that can store the instructions. By way of example, the memory 80 and/or the storage 82 may be ROM memory, random-access memory (RAM), flash memory, an optical storage medium, or a hard disk drive. The display 84 may be any suitable electronic display that can display information (e.g., logs, tables, cross-plots, reservoir maps, etc.) relating to properties of the well/reservoir as measured by the downhole tool 12. It should be appreciated that, although the data processing system 76 is shown by way of example as being located at the surface 74, the data processing system 76 may be located in the downhole tool 12. In such embodiments, some of the data 70 may be processed and stored downhole (e.g., within the wellbore 14), while some of the data 70 may be sent to the surface 74 (e.g., in real time). In certain embodiments, the data processing system 76 may use information obtained from petroleum system modeling operations, ad hoc assertions from the operator, empirical historical data (e.g., case study reservoir data) in combination with or lieu of the data 70 to determine certain parameters of the reservoir 15.

FIG. 2 depicts an example of a wireline downhole tool 100 that may employ the systems and techniques described herein to determine formation and fluid property characteristics of the reservoir 15. The wireline downhole tool 100 is suspended in the wellbore 14 from the lower end of a cable 104 (e.g., multi-conductor) that is spooled on a winch at the surface 74. Similar to the downhole tool 12, the wireline downhole tool 100 may be conveyed on wired drill pipe, a combination of wired drill pipe and wireline, or other suitable types of conveyance. The cable 104 is communicatively coupled to an electronics and processing system 106. The wireline downhole tool 100 includes an elongated body 108 that houses module 110, module 112, module 114, module 122, and module 124 that provide various functionalities including OD imaging, fluid sampling, fluid testing, operational control, and communication, among others. For example, the module 110 and module 112 may provide additional functionality such as fluid analysis, resistivity measurements, operational control, communications, coring, and/or imaging, among others.

As shown in FIG. 2, the module 114 is a fluid communication module that has an expandable packer 118. The expandable packer 118 is configured to selectively seal off or isolate selected portions of the wellbore wall 58 of the wellbore 14 to fluidly couple to the geological formation 20 adjacent to a respective portion of the expandable packer 118 and/or to draw fluid samples from the geological formation 20. The expandable packer 118 may include a single inlet 116 or multiple inlets designed for guarded or focused sampling. The reservoir fluid 50 may be expelled to the wellbore through a port in the body 108 or the reservoir fluid 50 may be sent to one or more modules 122 and 124. The modules 122 and 124 may include sample chambers that store the reservoir fluid 50. In the illustrated example, the electronics and processing system 106 and/or a downhole control system are configured to control the assembly of one or more extendable probes 116 and/or the drawing of a fluid sample from the geological formation 20 to enable analysis of the fluid properties of the reservoir fluid 50, as discussed above.

FIG. 3 illustrates a method 130 of various processes that may be performed based on analysis of well reports and/or well logs, in accordance with aspects of the present disclosure. A location of hydrocarbon deposits within a geological formation may be identified (process block 132) based on well-log data. In some embodiments, the well-log data may be analyzed to generate a map or profile that illustrates regions of interest with the geological formation.

Based on the identified locations and properties of the hydrocarbon deposits, certain positions or parts of the geological formation 20 may be explored (process block 134). That is, hydrocarbon exploration organizations may use the locations of the hydrocarbon deposits to determine locations at the surface of the geological formation 20 to drill into the Earth. As such, the hydrocarbon exploration organizations may use the locations and properties of the hydrocarbon deposits and the associated overburdens to determine a path along which to drill into the Earth, how to drill into the Earth, and the like.

After exploration equipment has been placed within the geological formation 20, the hydrocarbons that are stored in the hydrocarbon deposits may be produced (block 136) via natural flowing wells, artificial lift wells, and the like. Further, the produced hydrocarbons may be transported (block 138) to LNG and the like via transport vehicles, pipelines, and the like. Further still, the produced hydrocarbons may be processed (block 140) according to various refining procedures to develop different products using the hydrocarbons.

It should be noted that the processes discussed with regard to the method 130 may include other suitable processes that may be based on the locations and properties of hydrocarbon deposits as indicated in the seismic data acquired via one or more seismic survey. As such, it should be understood that the processes described above are not intended to depict an exhaustive list of processes that may be performed after determining the locations and properties of hydrocarbon deposits within the geological formation.

FIG. 4 illustrates an example process 150 that may be employed by the data processing system 76 to determine a dissociation constant of methane hydrate that may be used for certain oil and gas decisions, in accordance with embodiments described herein. The steps of the process 150 may be stored in the memory 80. Before proceeding, it should be noted that the process 150 is described as being performed by the processor 78 of the data processing system 76, but the process 150 may be performed by other suitable computing devices. Although described in a particular order, which represents a particular embodiment, it should be noted that the process 150 may be performed in any suitable order. Additionally, embodiments of the process 150 may omit process blocks and/or include additional process blocks.

At block 152, the processor 78 may measure one or more flow properties of a fluid within a reservoir of the geological formation 20 using a downhole tool, such as the downhole tool 12 as discussed in more detail with respect to FIG. 1 or the wireline downhole tool 100 as discussed in more detail with respect to FIG. 2. In any case, the processor 78 may cause one or more of the modules 110, 112, 114, 122, and/or 124 to operate, and thus acquire (e.g., obtain) measurements indicative of flow properties of the fluid within the reservoir 15. For example, the one or more flow properties may include a pressure, a flow rate, and/or change in concentration of a component (e.g., methane hydrate) of the fluid over time. In some embodiments, the processor 78 may receive the one or more measurements from a respective memory of the modules 110, 112, 114, 122, and/or 124.

In some embodiments, such as when the flow properties include multiple flow properties, block 152 may include measuring a first flow pressure at a first time point and then measuring a second flow pressure at a second time point. For example, the first flow pressure may be an initial pressure of a fluid flowing into the downhole tool 12. The second flow pressure may be an equilibrium pressure occurring at a time point after the first flow pressure.

At block 154, the processor 78 may determine a dissociation constant (e.g., dissociation rate) of one or more components within the reservoir 15 using the measured one or more flow properties acquired at block 152. In some embodiments, the processor 78 may utilize a kinetic equation that defines a relationship between the dissociation constant and the measured one or more flow properties.

At block 156, the processor 78 may generate a methane hydrate production output using the dissociation constant. In general, the methane hydrate production output may be an electronic or physical file that may be used to inform oil and gas decisions associated with the determined amount of methane hydrate within the reservoir 15. For example, the methane hydrate production output may be a well log that includes one or more values indicative of a chemical composition within the geological formation 20, which may be represented as a function of depth within the wellbore.

In some embodiments, the methane hydrate production output may include an amount of methane hydrate within the reservoir 15 and/or geological formation 20. In some embodiments, the amount of the methane hydrate may be represented a function of time. That is, the determined dissociate rate (e.g., which is indicative of the stability of the methane hydrate) may be used to represent how the amount of the methane hydrate may change over time. Moreover, depending on the volume and/or type of reservoir where the methane hydrate resides, the processor 78 with geological structure and petrophysical evaluation may determine an amount of methane hydrate within the geological formation 20. For example, it is presently recognized that a methane hydrate may reside in various pore structures within the geological formation 20 that may be characterized into one of multiple occurrence modes that indicate a volume of one or more reservoirs that include the methane hydrate. For example, the occurrence modes may include thick bedded modes, dispersed modes, nodular modes, near fault modes, and thin bedded modes.

As another non-limiting example, the methane hydrate production output may indicate the type of occurrence mode for the reservoir 15 that includes the methane hydrate, such as whether or not the methane hydrate is present in a thick bedded mode. It should be noted that knowledge of whether the methane hydrate is present in a certain type of occurrence mode, such as a thick bedded mode, may be useful for informing decisions related to the stability of the reservoir 15 and/or geological formation 20 as the methane hydrate is removed, whether by a downhole tool or dissociated from the hydrate.

In this way, the process 150 may be used to determine a dissociation constant of methane hydrate within a geological formation using flow properties that are measured while a downhole tool (e.g., the downhole tool 12 and wireline downhole tool 100) are within the geological formation. Accordingly, the measurements may provide a more accurate indication of the dynamic properties of the methane hydrate, thereby enable more accurate determinations of an amount of the methane hydrate within the reservoir, which may be used to inform one or more decisions by way of the methane hydrate production output.

As discussed above with respect to block 154 of process 150, a kinetic equation a non-limiting example, the kinetic equation for a methane hydrate may be:

$$\frac{dC_H}{dt} = k_d A_d (p_e - p_g) \tag{1}$$

In equation 1, $C_H$ is the concentration of methane hydrate, $k_d$ is the disassociation rate constant of a methane, $A_d$ the contact area associated with the disassociation rate (e.g., a cross-sectional area where the probes are receiving a flow of the fluid within the reservoir 15), $p_e$ is the equilibrium pressure, and $p_g$ is a flowing pressure reading from a pressure sensor. In this example, the one or more measured parameters may include $p_e$, $p_g$, and $dC_H/dt$. At least in some instances, $p_e$ may be stored in the memory 80 or provided using an input device of the data processing system 76 based on prior knowledge of the geological formation.

Figure 5:
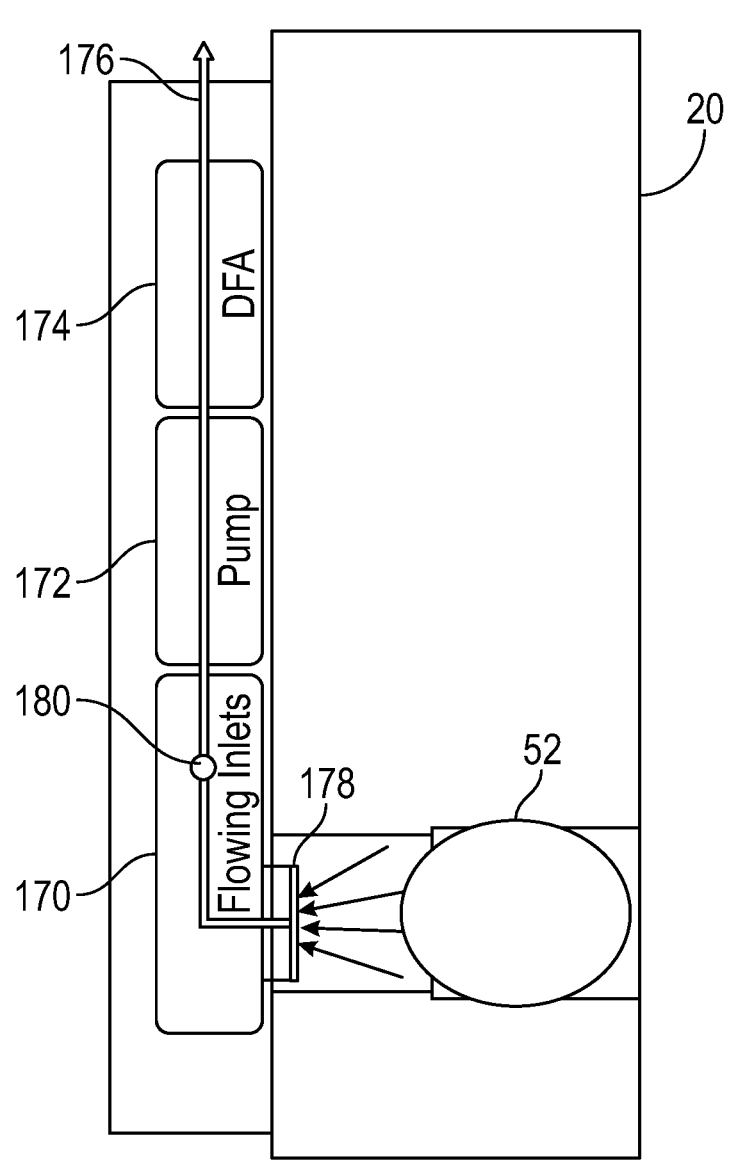
FIG. 5 is a schematic diagram of an embodiment of the downhole tool capable of performing measurements that may be used to determine a dissociation constant of the methane hydrate, in accordance with an embodiment of the present disclosure.

To better illustrate the discussion above with respect to block 152 of process 150, FIG. 5 illustrates a wireline downhole tool 100 having a flow module 170, a pump module 172, and a spectral module 174 that, in operation, measure multiple flow properties of a fluid flow 176 from the reservoir fluid 50 that is received by a probe (e.g., not shown) of the wireline downhole tool 100 along a plane defined by the line 178 (e.g., the contact area). In the illustrated embodiment, the flow module 170 may include a pressure sensor 180 that measures the pressure of the fluid (e.g., resulting in the fluid flow 176) from the reservoir. The pump module 172 may include one or more sensors that measure a flow rate of the fluid flow 176 through the pump module. The spectral module 174 may include one or more detectors (e.g., light detectors, electrical detectors, and the like) that may measure a property of the fluid within the fluid flow 176 to determine a concentration, mass, and/or volume of one or more components within the fluid flow 176.

In one embodiment, the different modules (e.g., the flow module 170, the pump module 172, and the spectral module 174) may acquire a different measurement that may be used to determine the dissociation constant of the methane hydrate. For example, the flow module 170 may measure the $p_g$ discussed above using a pressure gauge of the flow module 170 that measures the pressure of the fluid from the reservoir that is entering the flow module 170 and passing through the contact area.

Figure 6:
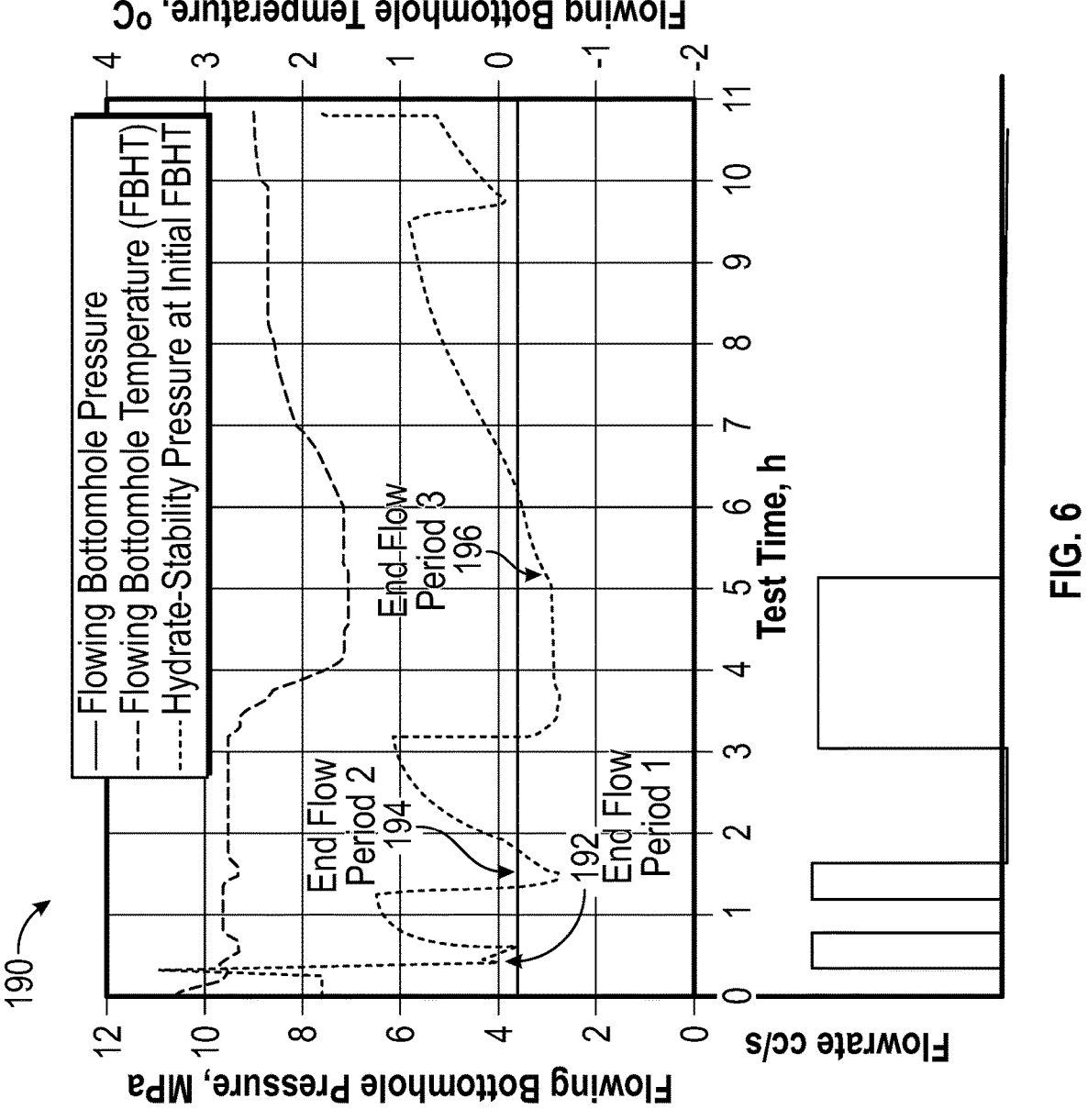
FIG. 6 shows a graph of measured pressure versus time associated with a formation fluid flowing into the downhole tool, in accordance with an embodiment of the present disclosure.

As discussed herein, in some embodiments, a wireline downhole tool 100 may measure multiple pressures at different time points. To illustrate this, FIG. 6 shows a graph 190 illustrating pressure versus time of a flowing bottom hole pressure, a flowing bottom hole temperature, and a hydrate stability pressure at an initial flowing bottom hole temperature. In the graph 190, a first time point 192, a second time point 194, and a third time point 196 are shown that corresponding to an end of different flow periods. For example, the first time point 192 may correspond to an end of an initial flow of fluid into the downhole tool, such as when mud is being removed prior to measurement. The time between the second time point 194 (e.g., that occurs after the first time point 192) and the third time point 196 may corresponding to a region that includes the initial flowing pressure (e.g., $p_g$) and the equilibrium pressure (e.g., $p_e$).

Returning to FIG. 5, the pump module 172 may measure a flow rate, $Q_t$, of the fluid flow 176 as the fluid flow 176 is within and/or passes through the flow module 170. Additionally, the spectral module 174 may determine relative amount of the components within the fluid flow 176, such as a gas fraction, $F_g$. The flow rate of the fluid flow 176, $Q_t$, and the gas fraction, $F_g$, may be used by the processor 78 to calculate the mass of the methane hydrate, $m_{g,\,H}$. For example:

$$m_{g,H} = Q_t {}^*F_g {}^* \rho_{CH_4} \tag{2}$$

Then, the processor 78 may determine the change in the concentration of the methane hydrate over time, $dC_H/dt$, using the calculated the mass of the methane hydrate. For example:

$$\frac{dC_H}{dt} = \frac{m_{g,H}}{\frac{n_g}{n_g + n_w} * \frac{n_g}{M_H}} \tag{3}$$

Using the determined values from equations 2 and 3, the dissociation constant may be determined by the processor 78 using equation 1. For example, the spectral module 174 (e.g., a downhole fluid analysis module) may allow for a gas and water fraction to be quantitatively determined. Then, using a meter total flowrate in the pump module 172, a gas flow rate may be determined. By relying on hydrate EOS equation and molecular formula, theoretical water flowrate can be calculated. According to mass conservation of hydrate, $dC_H/dt$ can be derived by calculated gas and water flowrate at different flowing pressure. In this way, the dissociation constant of the methane hydrate may be determined using a downhole tool within a formation and with different pressures, and thus, providing an accurate determination of the dissociation constant. Moreover, the dissociation constant may be used to generate a methane hydrate production output that may inform oil and gas decisions, such as where to drill, indicates a stability of a reservoir including the methane hydrate, and the like.

FIG. 7 illustrates an example process 200 that may be employed to generate a methane hydrate production output, in accordance with embodiments described herein. The steps of the process 200 may be stored in the memory 80. Before proceeding, it should be noted that the process 200 is described as being performed by the processor 78 of the data processing system 76, but the process 200 may be performed by other suitable computing devices. Although described in a particular order, which represents a particular embodiment, it should be noted that the process 200 may be performed in any suitable order. Additionally, embodiments of the process 200 may omit process blocks and/or include additional process blocks.

At block 202, the process 200 may include selecting one or more depth stations for a test based on petrophysical evaluation of methane hydrate. In general, the test may refer to the steps 152, 154, and 156 of process 150 of FIG. 4 and/or the subsequent steps of the process 200. A petrophysical evaluation may include well logs from other well logging techniques that provide an indication of one or more positions, locations, and areas (e.g., the one or more depth stations) for performing the test. In some embodiments, the processor 78 may select the one or more depths stations based on input provided by a user.

At block 204, the process 200 may include positioning the downhole tool to receive a formation fluid at one of the depth stations. In general, block 204 may include the processor 78 sending suitable control signals that cause the inlet 116 to be set around the borehole, expand the expandable packer 118, and other steps described herein that occur before fluid is received from the geological formation.

At block 206, the process 200 may include monitoring the gas breakdown during drawdown. In general, block 206 may involve the processor 78 sending a control signal that causes the inlet 116 to receive the formation fluid and the spectral module 174 may operate to detect the methane hydrate. For example, after the inlet is set, the inlet may slowly drawdown the pressure and monitor any gas breakthrough during the drawdown. In some embodiments, process 206 may correspond to the time period before the first time point 192 shown in FIG. 6

At block 208, the process 200 may include measuring fluid properties using the fluid analyzer based on observed methane gas. For example, processor 78 may send a suitable control signal to the spectral module 174 to measure and the processor 78 may receive the measurements obtained by the spectral module 174.

At block 210, the process 200 may include determining the hydrate dissociation rate based on the measured fluid properties. For example, the processor 78 may perform steps similar to block 154 of FIG. 4. After determining the hydrate dissociate rate, the process 200 may proceed with modifying the drawdown pressure. For example, the processor 78 may send a control signal that causes the drawdown pressure to be modified one or more times (e.g., 2 to 3 times). Then, at block 212, the process 200 proceeds with generating a methane hydrate production output, in a generally similar manner as described for block 156 of FIG. 4

The specific embodiments described above have been shown by way of example, and it should be understood that these embodiments may be susceptible to various modifications and alternative forms. It should be further understood that the claims are not intended to be limited to the particular forms disclosed, but rather to cover all modifications, equivalents, and alternatives falling within the spirit and scope of this disclosure.

The invention claimed is:

1. A method, comprising:
receiving a flow of a formation fluid into a downhole tool, wherein the formation fluid comprises methane hydrate from a geological formation;
measuring one or more flow properties of the formation fluid using the received flow of the formation fluid;
determining a dissociation constant of the methane hydrate based at least in part on:
a quotient of a change in concentration of the methane hydrate over time divided by a product of a contact area between the downhole tool and the geological formation and one or more measured flow properties of the formation fluid, wherein the change in concentration of the methane hydrate over time is determined based on:
a mass of methane hydrate defined according to a product of a gas fraction associated with the formation fluid, a density of methane, and a flow rate of the formation fluid;
modifying a drawdown pressure based on the dissociation constant; and
generating a methane hydrate production output based on the dissociation constant of the methane hydrate.

2. The method of claim 1, wherein the one or more flow properties comprise a pressure of the formation fluid flowing into the downhole tool.

3. The method of claim 2, wherein the one or more flow properties comprise an equilibrium pressure associated with the methane hydrate.

4. The method of claim 1, comprising measuring the one or more flow properties comprises measuring the one or more flow properties using one or more components of the downhole tool.

5. The method of claim 1, comprising:
determining a type of occurrence mode associated with a reservoir that includes the formation fluid; and
determining the methane hydrate production output based at least in part on the type of occurrence mode associated with the reservoir and the dissociation constant.

6. The method of claim 1, wherein the mass of methane hydrate is calculated based on a relationship according to:

$$m_{g,H} = Q_t {}^* F_g {}^* \rho_{CH4}$$

wherein $m_{g,H}$ is the mass of methane hydrate, $Q_t$ is the flow rate of the formation fluid, $F_g$ is the gas fraction, and $\rho_{CH4}$ is the density of methane.

7. The method of claim 1, wherein the one or more measured flow properties comprise an equilibrium pressure associated with the methane hydrate and a pressure of the formation fluid flowing into the downhole tool, wherein the dissociation constant is calculated based on a relationship according to:

$$dC_H/dt = k_d A_d (p_e - p_g)$$

wherein $dC_H/dt$ is the change in concentration of the methane hydrate over time, $k_d$ is the dissociation constant of the methane hydrate, $A_d$ is the contact area between the downhole tool and the geological formation, $p_e$ is the equilibrium pressure associated with the methane hydrate, and $p_g$ is the pressure of the formation fluid flowing into the downhole tool.

8. A tangible, non-transitory, computer-readable medium, comprising computer-readable instructions that, when executed by one or more processors, cause the one or more processors to:

receive one or more measured flow properties of a formation fluid associated with a reservoir within a geological formation, wherein the formation fluid comprises methane hydrate;

determining a dissociation constant of the methane hydrate based at least in part on:

a quotient of a change in concentration of the methane hydrate over time divided by a product of a contact area between a downhole tool and the geological formation and the one or more measured flow properties of the formation fluid, wherein the change in concentration of the methane hydrate over time is determined based on:

a mass of methane hydrate defined according to a product of a gas fraction associated with the formation fluid, a density of methane, and a flow rate of the formation fluid;

modifying a drawdown pressure based on the dissociation constant; and determining a methane hydrate production output based at least in part on the dissociation constant.

9. The computer-readable medium of claim 8, wherein the one or more measured flow properties of the formation fluid comprise a pressure of the formation fluid flowing into the downhole tool that measured the one or more measured flow properties, and an equilibrium pressure between the reservoir and an interior of the downhole tool.

10. The computer-readable medium of claim 9, wherein the dissociation constant is calculated based on a relationship according to:

$$dC_H/dt = k_d A_d(p_e - p_g)$$

wherein $dC_H/dt$ is the change in concentration of the methane hydrate over time, $k_d$ is the dissociation constant of the methane hydrate, $A_d$ is the contact area between the downhole tool and the geological formation, $p_e$ is the equilibrium pressure associated with the methane hydrate, and $p_g$ is the pressure of the formation fluid flowing into the downhole tool.

11. The computer-readable medium of claim 8, wherein the methane hydrate production output indicates a volume of the methane hydrate within the reservoir of the geological formation associated with the one or more measured flow properties.

12. The computer-readable medium of claim 8, wherein the instructions, when executed by the one or more processors, cause the one or more processors to output an indication of a stability of the reservoir based on the methane hydrate production output.

13. The computer-readable medium of claim 8, wherein the mass of methane hydrate is calculated based on a relationship according to:

$$m_{g,H} = Q_t * F_g * \rho_{CH4}$$

wherein $m_{g,H}$ is the mass of methane hydrate, $Q_t$ is the flow rate of the formation fluid, $F_g$ is the gas fraction, and $\rho_{CH4}$ is the density of methane.

14. A system, comprising:

a downhole tool configured to receive a flow of a formation fluid from a reservoir within a geological formation; and a data processing system communicatively coupled to the downhole tool, wherein the data processing system is configured to:

receive a first measurement indicative of a flowing pressure of the formation fluid into the downhole tool, wherein the formation fluid comprises methane hydrate;

receive a second measurement indicative of an equilibrium pressure of the formation fluid;

determine a dissociation constant associated with the methane hydrate based on;

a quotient of a change in concentration of the methane hydrate over time divided by a product of a contact area between the downhole tool and the geological formation and the flowing pressure, the equilibrium pressure, or both, wherein the change in concentration of the methane hydrate over time is determined based on:

a mass of methane hydrate defined according to a product of a gas fraction associated with the formation fluid, a density of methane, and a flow rate of the formation fluid;

modify a drawdown pressure based on the dissociation constant; and generate a methane hydrate production output based at least in part on the dissociation constant.

15. The system of claim 14, wherein the downhole tool is a formation testing downhole tool.

16. The system of claim 14, wherein the first measurement corresponds to a first time point, the second measurement corresponds to a second time point, and wherein the first time point occurs before the second time point.

17. The system of claim 14, wherein the data processing system is configured to determine the dissociation constant.

18. The system of claim 14, wherein the data processing system is configured to output an indication of a stability of the reservoir based on the methane hydrate production output.

19. The system of claim 14, wherein the mass of methane hydrate is calculated based on a relationship according to:

$$m_{g,H} = Q_t * F_g * \rho_{CH4}$$

wherein $m_{g,H}$ is the mass of methane hydrate, $Q_t$ is the flow rate of the formation fluid, $F_g$ is the gas fraction, and $\rho_{CH4}$ is the density of methane.

20. The system of claim 14, wherein the dissociation constant is calculated based on a relationship according to:

$$dC_H/dt = k_d A_d(p_e - p_g)$$

wherein $dC_H/dt$ is the change in concentration of the methane hydrate over time, $k_d$ is the dissociation constant of the methane hydrate, $A_d$ is the contact area between the downhole tool and the geological formation, $p_e$ is the equilibrium pressure associated with the methane hydrate, and $p_g$ is the pressure of the formation fluid flowing into the downhole tool.

* * * * *